US008760721B2

(12) United States Patent
Hara (10) Patent No.: US 8,760,721 B2
(45) Date of Patent: Jun. 24, 2014

(54) IMAGE PROCESSING APPARATUS AND NON-TRANSITORY COMPUTER READABLE MEDIUM

(71) Applicant: Fuji Xerox Co., Ltd., Tokyo (JP)

(72) Inventor: Yuki Hara, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/676,591

(22) Filed: Nov. 14, 2012

(65) Prior Publication Data

US 2013/0250353 A1    Sep. 26, 2013

(30) Foreign Application Priority Data

Mar. 22, 2012  (JP) ................................. 2012-065591

(51) Int. Cl.
*H04N 1/56* (2006.01)
*G06F 3/12* (2006.01)
*G06T 1/20* (2006.01)

(52) U.S. Cl.
USPC .............................. 358/1.9; 358/1.15; 712/15

(58) Field of Classification Search
None
See application file for complete search history.

(56) References Cited

U.S. PATENT DOCUMENTS

| 6,384,832 | B1 | 5/2002 | Muramatsu et al. |
| 8,055,880 | B2 | 11/2011 | Fujisawa et al. |
| 2002/0118203 | A1 | 8/2002 | Muramatsu et al. |
| 2004/0120359 | A1 | 6/2004 | Frenzel et al. |
| 2005/0248578 | A1 | 11/2005 | Meeker |
| 2006/0098229 | A1* | 5/2006 | Matsunaga et al. ............ 358/2.1 |
| 2007/0204131 | A1* | 8/2007 | Huppenthal et al. ............ 712/15 |
| 2010/0325387 | A1 | 12/2010 | Yamane et al. |
| 2011/0228293 | A1* | 9/2011 | Kimura .......................... 358/1.9 |
| 2011/0267645 | A1* | 11/2011 | Miyazaki ..................... 358/1.15 |
| 2011/0317205 | A1* | 12/2011 | Naito et al. .................. 358/1.15 |

FOREIGN PATENT DOCUMENTS

| CN | 101427264 A | 5/2009 |
| CN | 101930421 A | 12/2010 |
| EP | 1 333 381 A2 | 8/2003 |
| JP | A-2000-148707 | 5/2000 |

OTHER PUBLICATIONS

Jul. 19, 2013 Office Action issued in Chinese Patent Application No. 201210526453.9 (with English Explanation).

* cited by examiner

*Primary Examiner* — Thomas Lett
(74) *Attorney, Agent, or Firm* — Oliff PLC (57) ABSTRACT

An image processing apparatus includes plural auxiliary processing devices and a distribution section. The plural auxiliary processing devices perform predetermined processing on image data. The distribution section divides image data for one page into plural processing units, and distributes the plural processing units respectively to the auxiliary processing devices. The distribution section calculates the number of divisions indicating the number of pieces into which image data for one page is to be divided, in accordance with the number of auxiliary processing devices, the number of processing units that one auxiliary processing device is capable of simultaneously receiving and processing, and a degree of page parallelism indicating the number of pages of image data to be input while one auxiliary processing device processes image data for one page; divides the image data for one page into processing units; and distributes the processing units respectively to the auxiliary processing devices.

8 Claims, 6 Drawing Sheets

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-065591 filed Mar. 22, 2012.

BACKGROUND (i) Technical Field

The present invention relates to an image processing apparatus and a non-transitory computer readable medium.

(ii) Related Art

Digital printers or digital multifunctional devices (multifunction devices having printer, scanner, and copy functions) execute various image processing operations to perform tasks such as printing, including the interpretation of print data written in a page description language, the generation of a raster image based on the interpreted print data, color matching processing such as color space conversion, and the compression and expansion of the raster image data to be temporarily stored or transferred. In a high-speed system used in the field of, for example, professional printing, some of the above image processing operations may be executed by an auxiliary processing device such as a hardware accelerator to increase the processing speed of the system. To further increase the processing speed, the printer system may have plural hardware accelerators, and the plural hardware accelerators may process, in parallel, plural processing units called bands or tiles into which image data for each page is divided.

Each of the hardware accelerators may be, for example, a dynamic reconfigurable processor (DRP) having an internal logic circuit which is dynamically reconfigurable.

SUMMARY

According to an aspect of the invention, there is provided an image processing apparatus including plural auxiliary processing devices and a distribution section. The plural auxiliary processing devices perform predetermined processing on image data. The distribution section divides image data for one page into plural processing units, and distributes the plural processing units respectively to the auxiliary processing devices. The distribution section calculates the number of divisions indicating the number of pieces into which image data for one page is to be divided, in accordance with the number of auxiliary processing devices, the number of processing units that one auxiliary processing device is capable of simultaneously receiving and processing, and a degree of page parallelism indicating the number of pages of image data to be input in a period during which one auxiliary processing device processes image data for one page; divides the image data for one page into processing units, the number of which is equal to the calculated number of divisions; and distributes the processing units respectively to the auxiliary processing devices.

BRIEF DESCRIPTION OF THE DRAWINGS

An exemplary embodiment of the present invention will be described in detail based on the following figures, wherein.

DETAILED DESCRIPTION

First, an example of an image processing apparatus according to an exemplary embodiment will be described with reference to FIG. 1. The image processing apparatus may be an apparatus included in or connected to a printer (not illustrated), and may generate raster image data to be supplied to the printer.

Figure 1:
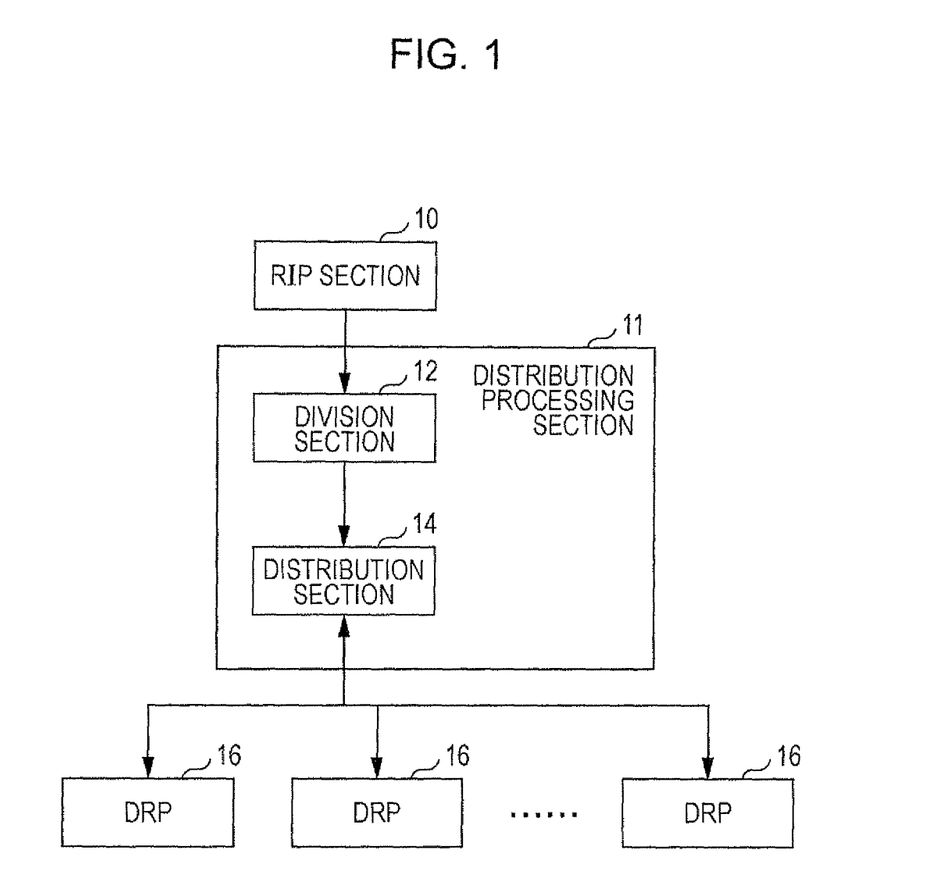
FIG. 1 illustrates an example of an image processing apparatus according to an exemplary embodiment.

In the example illustrated in FIG. 1, a raster image processor (RIP) section 10 interprets print data written in a page description language (PDL), which has been input to the image processing apparatus from an external device (e.g., a personal computer or a transportable storage medium), and converts the print data into intermediate image data. Examples of the intermediate image data include, but are not limited to, display list data. Examples of the format of intermediate data include a format in which each object (e.g., character font, graphic figure, continuous-tone image) that is one of image elements constituting an image is expressed for each scanning line in raster scanning or expressed using a collection of rectangular shapes called rectangles into which each object is segmented. In a case where each object is segmented into rectangles, the arrangement of the object is managed using, for example, the coordinates of the corners of the rectangles. For example, an object is managed as a piece of segment data representing a segment in which the object occupies one scanning line, and each piece of segment data includes the coordinates of the start and end points of the corresponding segment, information indicating the type (text, graphics, continuous-tone image, etc.) of object arranged in the segment, and a pixel value attribute on the segment data (such as a pixel value for text or graphics, or the address of an image to be mapped onto the segment data for a continuous-tone image (i.e., in this example, the body of the image is stored in a different location)). The RIP section 10 processes data written in the PDL to generate intermediate data in units of pages in page order.

The term "RIP" etymologically means processing for converting PDL print data into raster image data or means a processing device for performing the processing. In recent years, there have been an increasing number of cases where PDL data is temporarily converted into intermediate data to be handled because of ease of data handling (e.g., temporary storage or transfer, or some image processing operations), and the above-described conversion or a device for performing the above-described conversion may also be referred to as a RIP. FIG. 1 illustrates an example of this case.

The RIP section 10 may process print data using a single interpretation process page-by-page in order starting from the top page. Alternatively, the RIP section 10 may execute plural interpretation processes and sequentially assign pages to the processes to process plural pages in parallel. In the latter case, because of, for example, the different processing loads of pages, intermediate data for a later page in page order may be completed before that for an earlier page. Such a disorder of the pages may be corrected in any step before the respective pieces of raster image data for the pages are finally output to a printer in page order. For example, the disorder of the pages may be corrected when image data is output from the RIP section 10, or may be corrected when the processing units are distributed from a distribution section 14 to individual DRPs 16. Alternatively, the disorder of the pages may be corrected when the distribution section 14 receives a processing result for each processing unit from each of the DRPs 16, combines the processing results into a raster image for the corresponding page, and transfers the raster image to the printer (or the disorder of the pages may be corrected at any time in two of the above-described steps).

The output of the RIP section 10 is input to a distribution processing section 11. The distribution processing section 11 includes a division section 12 and the distribution section 14. The division section 12 divides intermediate data for each page to be supplied from the RIP section 10 in page order into processing units such as bands or tiles. Each band is a fragment obtained by dividing a page in the sub-scanning direction (which is a direction in which sheets are transported during a printing operation) or in the main scanning direction (which is a direction perpendicular to the sub-scanning direction), and each tile is a fragment obtained by dividing a page both in the main scanning direction (which is a direction perpendicular to the sub-scanning direction) and in the sub-scanning direction. Each processing unit that is a result of dividing one page may not necessarily have an equal area. In this exemplary embodiment, the division section 12 divides each page into an appropriate number of processing units. The number of processing units into which each page is divided is referred to as the number of divisions. A method for determining the number of divisions will be described in detail below.

The distribution section 14 distributes intermediate data of the respective processing units obtained through the division processing of the division section 12 to the plural DRPs 16. A detail example of the distribution processing of the distribution section 14 will be described below.

The RIP section 10, the division section 12, and the distribution section 14, which have been described above, are implemented by, for example, a computer including a central processing unit (CPU) and a memory by executing a program describing the processing of each of the RIP section 10, the division section 12, and the distribution section 14. The plural DRPs 16 are connected to the computer as hardware auxiliary processing devices. In this way, the image processing apparatus according to this exemplary embodiment includes a computer that achieves principal functions such as the functions of the RIP section 10, and the plural DRPs 16 serving as auxiliary processing devices.

The DRPs 16 are processors each having an internal logic circuit which is dynamically reconfigurable. In this exemplary embodiment, first, for example, each of the DRPs 16 is reconfigured into a rasterization circuit to generate a raster image from (or rasterize) intermediate data for the processing unit to be processed. Then, the DRP 16 is reconfigured into a color matching circuit to perform color matching processing on the raster image, and the DRP 16 is further configured as a data compression circuit to compress the data of the raster image subjected to color matching. The compressed raster image data output from each of the DRPs 16 is sent to a combining section (not illustrated), and the combining section generates integrated compressed raster image data for each page. The compressed raster image data integrated for each page is transferred to, for example, a print engine connected downstream of the image processing apparatus, and is expanded by an expansion circuit provided in the print engine to produce raster image data. The print engine prints an image onto a sheet in accordance with the raster image data. While rasterization, color matching, and image data compression have been given as illustrative examples of image processing operations executed by the DRPs 16, these processing operations are merely examples. An image processing operation to be executed by the DRPs 16 may be determined by taking into account factors such as the intended application and desired processing performance. For example, each of the DRPs 16 may perform only rasterization and color matching, and the combining section (not illustrated) may combine the outputs of the DRPs 16 into raster image data for each page and then compress the raster image data for the page (this is also merely an example).

The data to be processed, which has been input to each of the DRPs 16, is sequentially processed by a series of processing circuits that are configured into a pipeline in the DRP 16 in accordance with configuration data. Each of the DRPs 16 may have a local memory that holds a result of pipeline processing. In addition, each of the DRPs 16 is reconfigured in accordance with other configuration data to construct a pipeline for other processing in the DRP 16, and data obtained as a result of processing performed with the preceding configuration is input to the pipeline having the new configuration and is processed. By repeating reconfiguration and data input as described above, each of the DRPs 16 executes a series of image processing operations.

Each of the DRPs 16 has a configuration capable of executing in parallel the input and output of data to and from the computer in the image processing apparatus and the processing of input data in accordance with the internal circuit configurations. For example, each of the DRPs 16 enables a circuit configuration for inputting and outputting data and a circuit configuration for processing input data (which is temporarily stored in the local memory) to operate independently, and enables the circuit configurations to handle data of different processing units. In this exemplary embodiment, the processing efficiency of the DRPs 16 may be achieved using the functionality of the DRPs 16 described above. This point will be described with reference to FIGS. 2A and 2B.

Figure 2A:
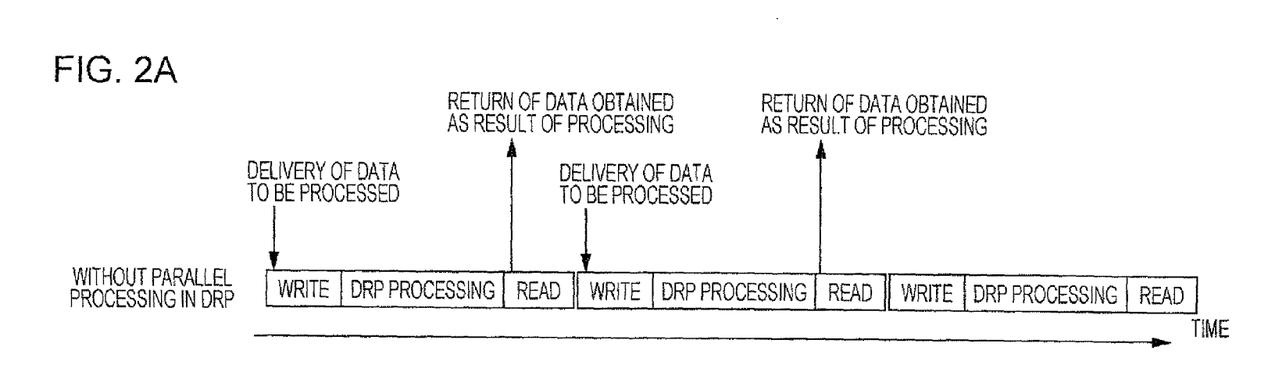
FIGS. 2A and 2B illustrate, for comparison, a case where a DRP sequentially performs data input and output and data processing and a case where a DRP performs data input and output and data processing in parallel.

FIG. 2A is a time chart illustrating a case where each of the DRPs 16 is caused to simply sequentially process data of individual processing units. In order to allow each of the DRPs 16 to process data of each processing unit, first, the main CPU of the image processing apparatus delivers processing unit data to be processed to the DRP 16 ("Write" operation). When the delivery of the data is completed, the DRP 16 processes the processing unit data with its internal circuit being dynamically reconfigured ("DRP processing"). When the processing is completed, the DRP 16 returns data of the processing result to the main CPU ("Read" operation, for the main CPU). In the case illustrated in FIG. 2A in which parallelism between data input and output and data processing is not utilized, as described above, the cycle of data delivery, data processing, and data return is sequentially repeated for each individual processing unit.

Figure 2B:
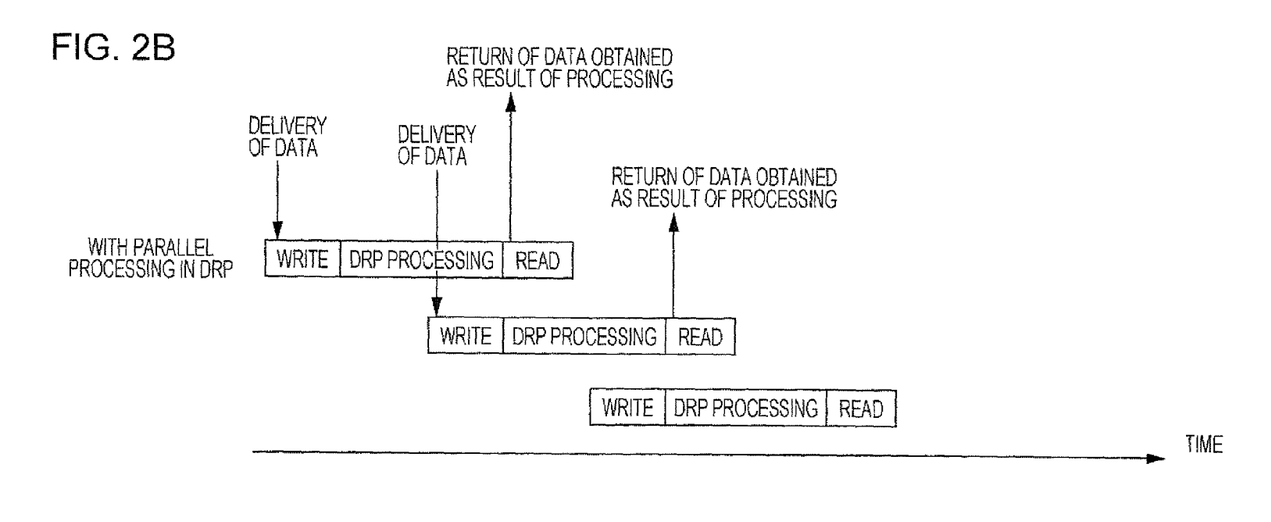

FIG. 2B is a time chart illustrating a case where each of the DRPs 16 is caused to execute data input and output and data processing in parallel. In the illustrated example, while one of the DRPs 16 is executing DRP processing on the first processing unit (in FIG. 2B, the upper left bar), the data of the next processing unit is delivered to the same DRP 16 (in FIG.

2B, the center bar). In FIG. 2B, at the same time as the completion of DRP processing on the first processing unit, the delivery of the next processing unit is completed. However, this is merely an example. It may only be required that the delivery of the data of the next processing unit has been completed at the time when DRP processing of the preceding processing unit is completed. Immediately when DRP processing of the first processing unit is completed, DRP processing of the next processing unit which has been received is started. This DRP processing is executed in parallel to the return of the result of DRP processing for the first processing unit to the main CPU. In this way, each of the DRPs 16 performs data input and output and data processing in parallel, thereby substantially eliminating the time period required for data input and output and increasing the processing speed accordingly.

In this exemplary embodiment, by way of example, each of the DRPs 16 is caused to perform data input and output and data processing in parallel in the manner indicated in the time chart illustrated in FIG. 2B.

In a case where each of the DRPs 16 executes data input and output and data processing in parallel in the manner described above, the DRP 16 is generally involved with two processing units (i.e., one processing unit is input or output and the other processing unit is processed). In order to allow the DRPs 16 that operate in this mode to efficiently operate, it is desirable that two processing units in average be distributed to each of the DRPs 16.

To this end, simply, data for each page may be divided into pieces, the number of which is given by multiplying the number of DRPs 16 by 2. In this case, however, data is divided into too many pieces, and the operation overhead of the DRPs 16 becomes too high, like the overhead involved in, for example, the initialization for each processing unit. To reduce the overhead, in this exemplary embodiment, the division section 12 determines the number of divisions for each page in the following way.

Specifically, first, a degree of page parallelism P is determined in accordance with the following equation:

$$P=T1/T2,$$

where T1 denotes a time period required for one of the DRPs 16 to process intermediate data for one page, and T2 denotes a time interval during which the division section 12 receives intermediate data for each page from the RIP section 10 (in other words, a time period required for the RIP section 10 to generate intermediate data for one page). In other words, the degree of page parallelism P is a value obtained by dividing the processing speed of the RIP section 10 by the processing speed of the DRP 16. That is, the degree of page parallelism P is a value representing the number of pages for which the RIP section 10 generates intermediate data for a period during which the DRP 16 processes intermediate data for one page.

Here, the degree of page parallelism P may be set as a fixed value and stored in the image processing apparatus. For example, the processing speeds for the RIP section 10 and each of the DRPs 16 to process a page having average content which is handled by the image processing apparatus may be determined using an experiment or the like, and a degree of page parallelism P may be calculated from the results of the experiment and may be set.

In another example, the processing speed of the RIP section 10 or each of the DRPs 16 or the processing speeds of the RIP section 10 and each of the DRPs 16 may be continuously monitored (for example, the division section 12 may monitor the arrival interval of pages from the RIP section 10) during the processing of print data, and a degree of page parallelism P may be dynamically calculated from the monitoring result. For example, feedback control may be performed in which a degree of page parallelism P determined from a monitoring result for a certain period is used to calculate the number of divisions for the next period. If the processing speed of the RIP section 10 or each of the DRPs 16 is monitored, the processing speed of the remaining device or devices may be a processing speed for a standard page which has been determined in advance using an experiment or the like.

Then, the number of divisions (the value indicating the number of processing units into which one page is to be divided) N is calculated in accordance with the following equation;

$$\text{Number of divisions } N=(\text{Number of DRPs}\times 2)/\text{degree of page parallelism } P. \quad (1)$$

In equation (1), the number of DRPs is multiplied by 2 because two processing units are distributed to each of the DRPs 16 per unit time period (in this example, the time period required for each of the DRPs 16 to process intermediate data for one page). That is, equation (1) is used when, for example, each of the DRPs 16 is capable of simultaneously handling two processing units (one processing unit to be input or output and the other processing unit to be subjected to data processing). The degree of page parallelism P is the denominator because data for P pages is input per unit time period as the target to be processed.

The division section 12 divides intermediate data for one page, which is input from the RIP section 10, into processing units, the number of which is equal to the number of divisions N determined in the manner described above.

Figure 3:
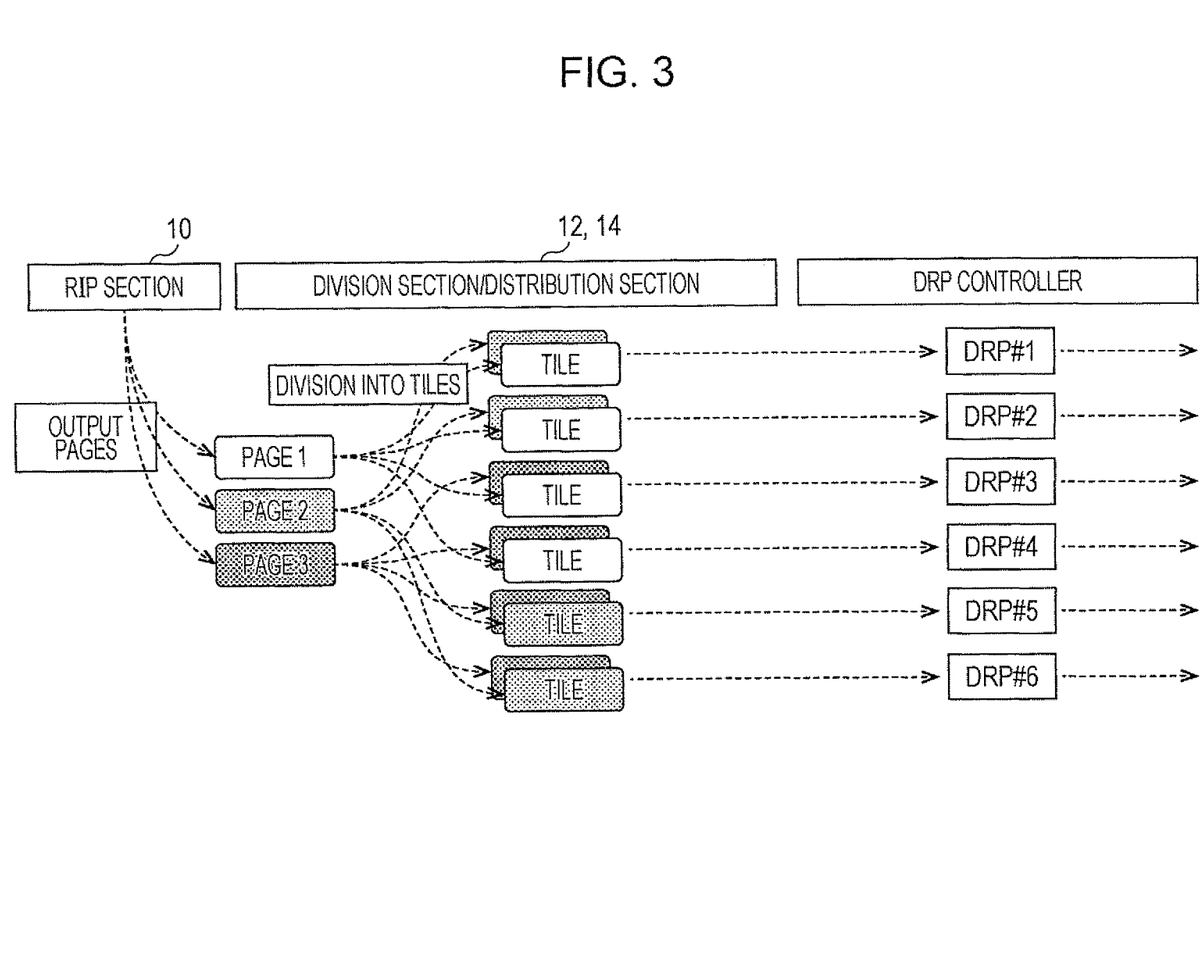
FIG. 3 illustrates an example of the division of a page into pieces and the distribution of the pieces when intermediate data for three pages is supplied within a unit time period from an RIP section in a device including six DRPs.

In the example illustrated in FIG. 3, by way of example, data for three pages is supplied per unit time period from the RIP section 10 to the division section 12 (i.e., the degree of page parallelism P is 3). It is assumed that the image processing apparatus includes six DRPs 16.

In this case, the number of divisions N=4 is obtained from the equation given above, and the division section 12 divides one page into four processing units (e.g., tiles). Accordingly, data for three pages per unit time period is divided into 12 processing units in total, and the 12 processing units are distributed to the six DRPs 16 by two. Through the determination of the number of divisions in the manner described above, two (i.e., the number of processing units that one DRP 16 is capable of simultaneously handling in parallel) processing units are delivered to each of the DRPs 16 per unit time period.

The processing of the division section 12 described above may reduce the number of processing units corresponding to data for three pages, compared to the case where each page is divided into 6×2=12 pieces. Thus, the number of times each of the DRPs 16 undergoes initialization or the like per processing unit may be reduced, and the processing efficiency of the DRPs 16 may be improved.

Figure 4:
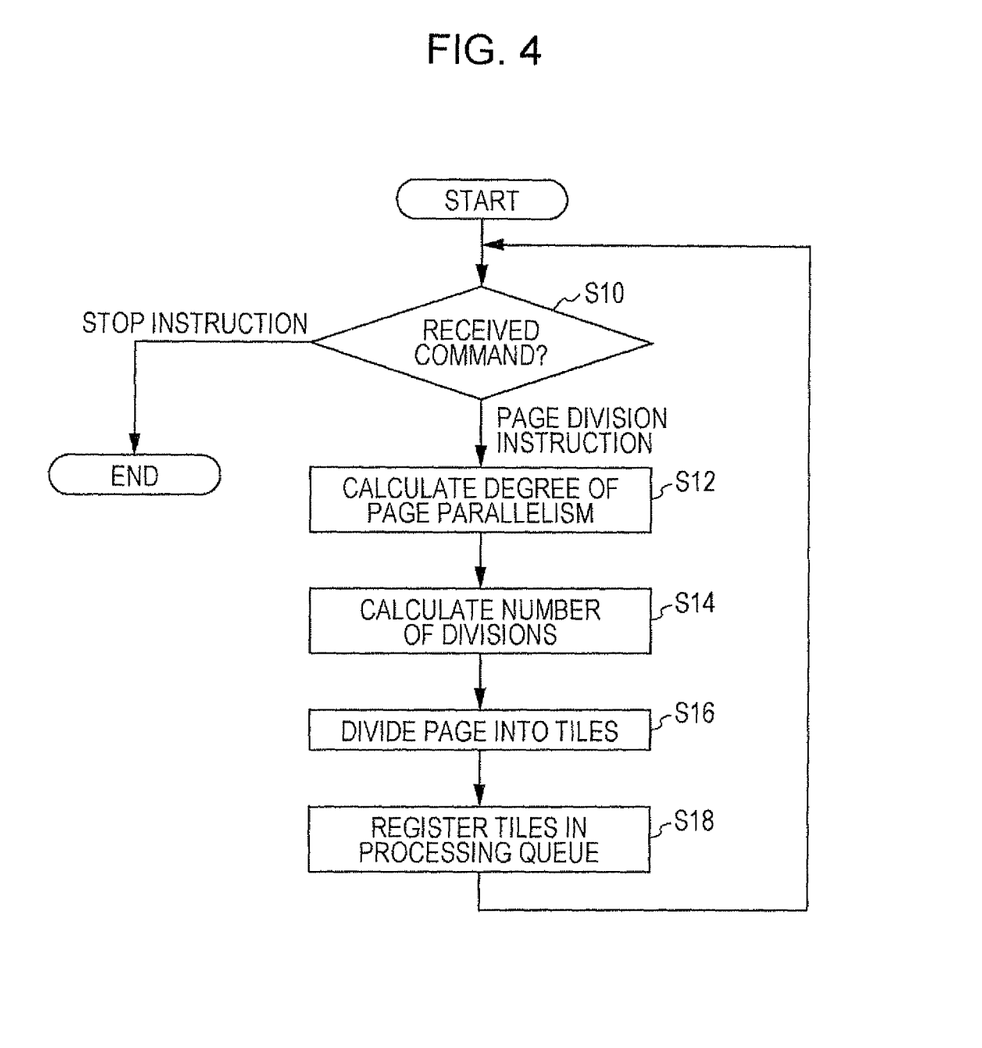
FIG. 4 illustrates an example of a processing procedure performed by a division section.

FIG. 4 illustrates an example of a processing procedure performed by the division section 12. In this procedure, the division section 12 waits a command from the RIP section 10 located upstream of the division section 12 (S10). If a stop instruction command is received, the process ends. If a page division instruction is received, the division section 12 receives intermediate data for one page to be processed, and the process proceeds to S12. In S12, the division section 12 determines a degree of page parallelism P. In an example in which the degree of page parallelism P is a fixed value, the division section 12 may acquire the fixed value P set in the image processing apparatus. In an example in which a degree of page parallelism P is dynamically adjusted on the basis of a monitoring result in actual processing, the division section 12 calculates a degree of page parallelism P from the most recent information from the RIP section 10, such as the interval of pages received. When a degree of page parallelism P is obtained in the manner described above, the division section 12 calculates the number of divisions N using the value P and the number of DRPs (which may be set in advance in the image processing apparatus) (S14). Then, the division section 12 divides the intermediate data in the received page into N processing units (e.g., tiles) in accordance with the determined number of divisions N (S16). Then, the division section 12 registers the intermediate data of the N processing units, which is a result of division, to a processing queue included in the distribution section 14 (S18). The intermediate data of each processing unit which is registered in the processing queue is associated with identification information identifying which processing unit the data is and on which page of the print data the data is located.

The division section 12 may sequentially divide intermediate data for pages supplied from the RIP section 10 in units of one page using a single division process. Alternatively, the division section 12 may execute plural division processes and sequentially assign pages to the processes to divide plural pages in parallel. In the latter case, for example, because the loads involved in division processing differ from page to page (intermediate data may not be easily divided, unlike a raster image), the division of a later page in page order may be completed before the division of an earlier page. Such a disorder of the pages may be corrected in any step before the respective pieces of raster image data for the pages are finally output to a printer in page order. For example, the disorder of the pages may be corrected when processing units are distributed from the distribution section 14 to the individual DRPs 16. Alternatively, the disorder of the pages may be corrected when the distribution section 14 or the combining section (not illustrated), rather than the distribution section 14, which performs combining processing receives a processing result for each processing unit from each of the DRPs 16, combines the processing results into a raster image for the corresponding page, and transfers the raster image to the printer (or, alternatively, the disorder of the pages may be corrected at any time in two of the above-described steps).

Next, an example of the processing procedure by the distribution section 14 will be described.

Figure 5:
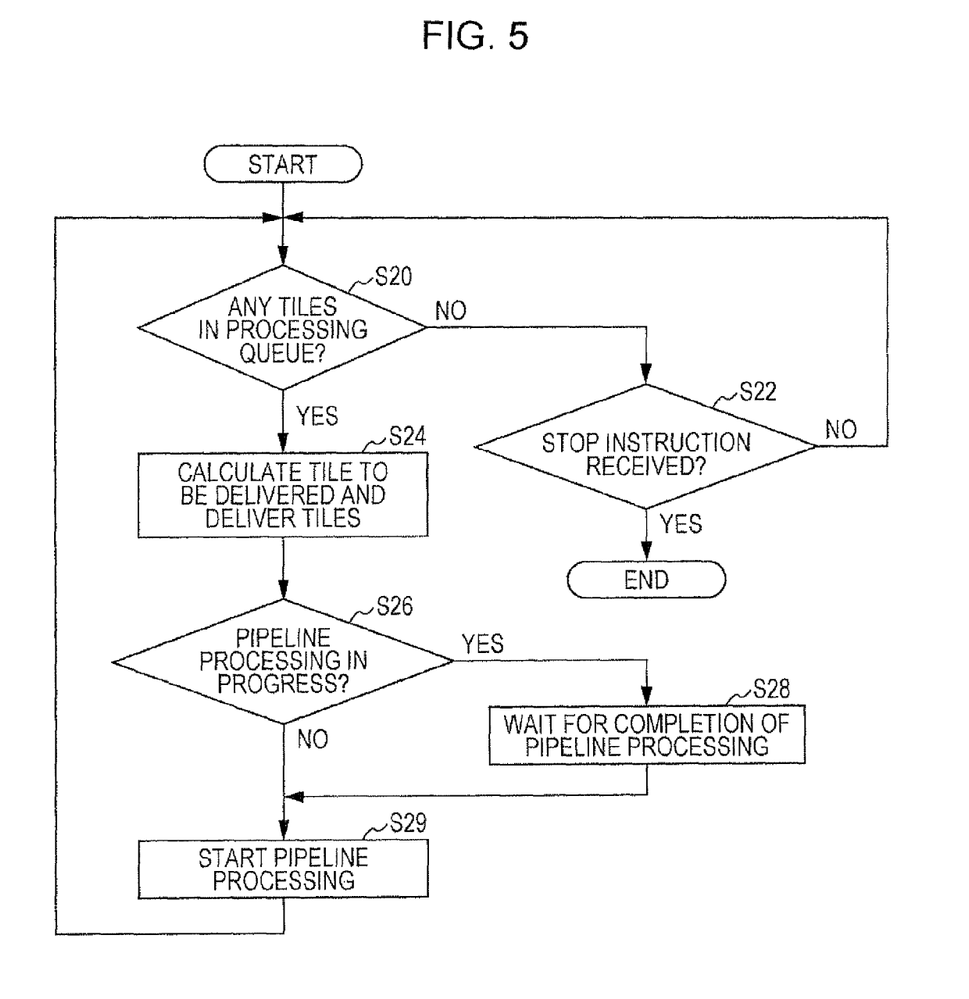
FIG. 5 illustrates an example of an overall processing procedure performed by a distribution section.
Figure 6:
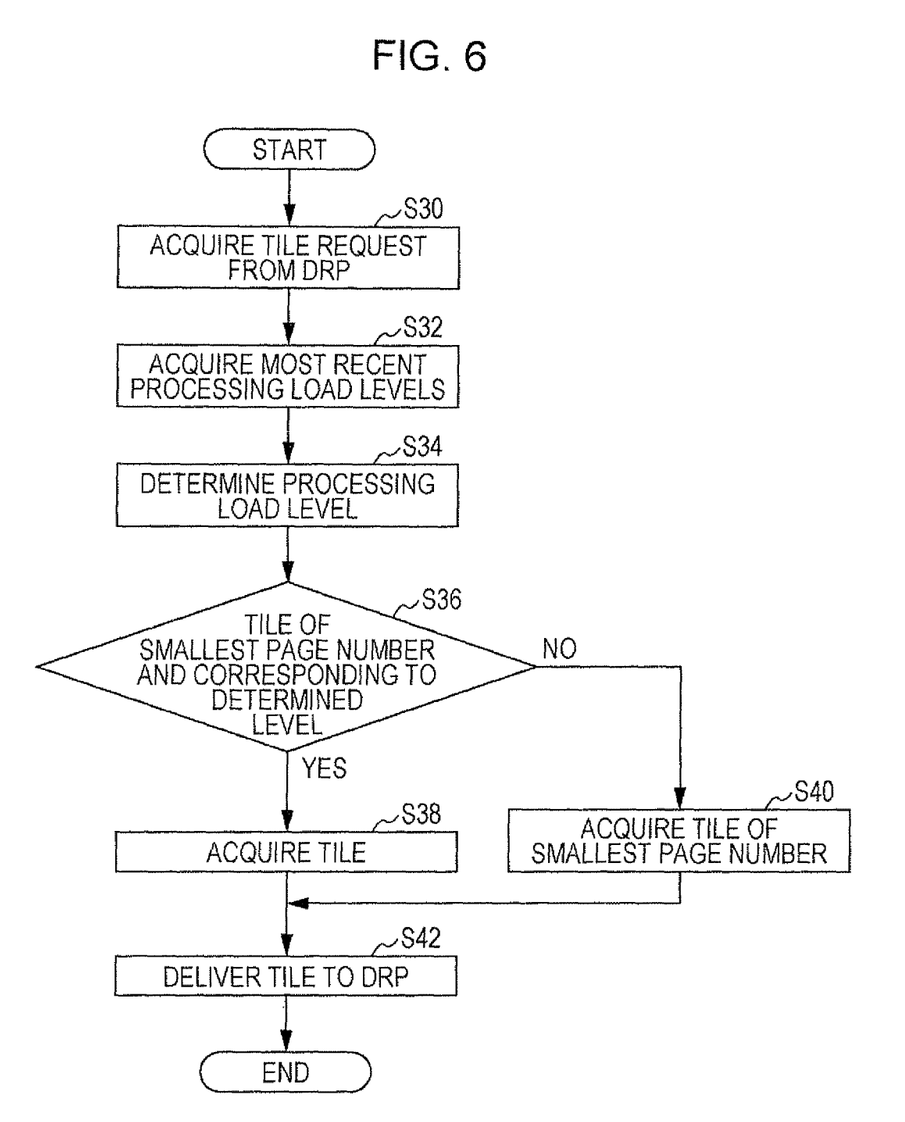
FIG. 6 illustrates an example of a procedure for determining a processing unit to be delivered, which is performed by the distribution section.

The processing loads imposed on the DRPs 16 generally differ from one processing unit to another because of reasons such as that the amount of intermediate data of each individual processing unit that is a result of division varies from one processing unit to another, unlike raster image data (e.g., the amount of intermediate data of a processing unit including a complicated image is large). The respective processing units may be sequentially distributed to the DRPs 16 simply so as not to break a page order without taking the processing loads into account. In the following example, however, the processing loads imposed on the respective DRPs 16 are controlled to be uniform as much as possible. FIGS. 5 and 6 illustrate an example of this processing procedure.

In the procedure illustrated in FIG. 5, first, the distribution section 14 determines whether or not any undistributed processing units (e.g., tiles) are in the processing queue (S20). If no undistributed processing units are in the processing queue (No in S20), the distribution section 14 determines whether or not a stop instruction due to events such as the completion of print data has been received from an upper controller (not illustrated) (S22). If a stop instruction has been received, the procedure ends. If no stop instruction has been received, the distribution section 14 continuously monitors the processing queue (S20).

If it is determined in S20 that any undistributed processing units are in the processing queue, the distribution section 14 determines a processing unit to be delivered to a DRP 16 among the processing units in the processing queue, and delivers the processing unit (S24). A detailed example of the processing of S24 is illustrated in FIG. 6.

In the procedure illustrated in FIG. 6, each time a request for delivering a processing unit (e.g., a tile) from any of the DRPs 16 is obtained (S30), the distribution section 14 executes the processing of S32 to S42. In the illustrated example, it is assumed that, each time each of the DRPs 16 completes the processing of a given processing unit, the DRP 16 starts the processing of the next processing unit received in parallel to, or concurrently with, the processing of the given processing unit being executed, and further requests the distribution section 14 to deliver the further next processing unit.

Upon receiving a delivery request from the DRP 16, the distribution section 14 acquires history information on the most recent processing load levels of data delivered to the DRP 16 a predetermined number of times (S32).

The processing load level is a level indicating the weight of the processing load of intermediate data of a processing unit. A processing load level of a processing unit may be determined from, for example, the type or number of objects included in the processing unit. For example, a continuous-tone image imposes a higher processing load than text or graphics. Thus, if intermediate data is in a format in which each object that is one of image elements constituting an image is expressed for each scanning line in raster scanning or expressed using segment data obtained by segmenting into rectangles, it is possible to represent the amount of processing load of a processing unit using a numerical representation, by determining the number of pieces of segment data for each type of object in the processing unit and performing processing such as multiplying a weighted value of the processing load for each type of object (which may be determined in advance) by the number of pieces of segment data for each type of object in the processing unit and weighted adding the results. The amount of processing load determined in the manner described above is mapped to a processing load level determined in advance using threshold determination or the like. The amount of processing load may be represented using three levels, "heavy" (which is expressed by, for example, value "1"), "standard" (which is expressed by, for example, value "0"), and "light" (which is expressed by, for example, value "−1"), or using more than three levels, if necessary. It is to be understood that the amount of processing load may be represented using a value representing a processing load level. For example, the distribution section 14 stores, for each of the DRPs 16, the most recent processing load levels of processing units which have been delivered to the DRP 16 a predetermined number of times using, for example, the ring buffer method, and acquires the stored most recent processing load levels in S32. Note that each of the DRPs 16 may receive information on processing load levels together with data of a processing unit from the distribution section 14, store the most recent processing load levels which have been delivered a predetermined number of times, and notify the distribution section 14 of the stored information when the DRP 16 requests the distribution section 14 to deliver the next processing unit.

Then, the distribution section 14 determines a processing load level of a processing unit to be delivered to the requesting DRP 16 in response to the request acquired in S30, in accordance with the information acquired in S32 (S34). The determination of the processing load level is based on a criterion in which the time averages of processing load levels of processing units to be distributed to the respective DRPs 16 are made substantially uniform across the DRPs 16 while the page order is maintained.

For example, it is assumed that there are three processing load levels, "heavy", "standard", and "light", and the number of most recent previous processing units on which information is to be acquired in S32 is one (i.e., information on only the previous delivered processing unit is acquired). In this case, if the previous processing load level is "heavy" (=1), it is determined that it is appropriate that the processing load level of the current processing unit to be delivered be "light" (=−1). Conversely, if the previous processing load level is "light", it is determined that it is appropriate that the processing load level of the current processing unit to be delivered be "heavy". Further, if the previous processing load level is "standard", it is determined that it is appropriately that the processing load level of the current processing unit to be delivered be "standard".

Alternatively, the most recent processing load levels of previous processing units which have been delivered to the DRP 16 n times (where n is an integer of 2 or more) may be acquired, and the processing load level of the current processing unit to be delivered may be determined so that the average of the acquired processing load levels and the processing load level of the current processing unit to be delivered is close to "standard".

For normal print data, the average of the amounts of processing load of the processing units into which the print data is divided may be regarded as being "standard" regardless of the method of division of the print data. Thus, as in the example described above, a time average of processing load levels of processing units which have been delivered to each DRP 16 is made to represent "standard", resulting in the load being distributed substantially uniformly across the respective DRPs 16.

Accordingly, instead of a processing load level being determined from the history for each DRP 16, the histories of processing load levels of processing units which have been delivered to the respective DRPs 16 may be compared, and the processing load level of the current processing unit to be delivered to the requesting DRP 16 may be determined so that the average values of the processing load levels of the respective DRPs 16 in the histories are made substantially uniform.

Then, the distribution section 14 searches for the processing unit corresponding to the processing load level determined in S34 from among processing units of the smallest page number out of the processing units included in the processing queue (S36). The processing load level of data of each processing unit may be determined, for example, when the division section 12 divides a page into processing units, and may be stored in a processing queue in association with data of the corresponding processing unit. Alternatively, when receiving data of each processing unit that is a result of division from the division section 12, the distribution section 14 may determine the processing load level of each of the processing units. In any case, since the distribution section 14 is capable of obtaining a processing load level of each processing unit in a processing queue, the distribution section 14 may specify a processing unit that satisfies the condition in S36 in accordance with the obtained information.

If any of the processing units matches the condition (YES in S36), the distribution section 14 extracts the processing unit from the processing queue (S38), and delivers the extracted processing unit to the requesting DRP 16 (S42). If none of the processing units satisfies the condition (NO in S36), the distribution section 14 extracts any one of the processing units of the smallest page number in the processing queue (S40), and delivers the extracted processing unit to the requesting DRP 16 (S42).

According to the processing procedure described above, the respective processing units are distributed to the DRPs 16 so that the loads on the respective DRPs 16 are equalized as much as possible while the page order is maintained.

In the procedure illustrated in FIG. 6, the processing load level of the processing unit to be delivered to the requesting DRP 16 is determined in S34, and the processing unit corresponding to the determined processing load level is searched for in S36. This processing flow is merely an example. Instead of using the two steps, a single step may be used in which one of the processing units of the smallest page number in the processing queue for which the time average of the processing load levels of the processing units which have been delivered to the requesting DRP 16 is the closest to the average of all the DRPs 16 is determined as the target to be delivered.

When the determination and delivery of the processing unit to be delivered (S24 in FIG. 5) are completed, the distribution section 14 determines whether or not the DRP 16 to which the processing unit is to be delivered is executing pipeline processing for the previous delivered processing unit (S26). If the pipeline processing for the previous delivered processing unit is in progress, the distribution section 14 waits for a notification of completion of the pipeline processing from the DRP 16 (S28). When the pipeline processing of the previous delivered processing unit is completed, the distribution section 14 sends an instruction to the DRP 16 to start pipeline processing on the current delivered processing unit (S29). Then, the process returns to S20. The processing loop of S20 to S42 described above is repeated until the overall processing of the print data is completed.

In the foregoing description, each of the DRPs 16 is capable of simultaneously handling up to two processing units (one processing unit to be input or output and the other processing unit to be subjected to data processing), by way of example. The page division and distribution method according to this exemplary embodiment may also be applied when each of the DRPs 16 is capable of simultaneously handling any number of processing units other than two. For example, a single DRP 16 may include plural circuits having the same configuration to process plural processing units in parallel. In this case, the number of processing units that the DRP 16 is capable of simultaneously handling may be increased in accordance with the number of processing units to be processed in parallel. In this case, in equation (1) given above to determine the number of divisions, the coefficient "2" may be changed to the number of processing units that each DRP is capable of simultaneously handling.

The components (particularly, the distribution processing section 11) of the image processing apparatus described above as illustrative examples, except the DRPs 16, are implemented by, for example, causing a general-purpose computer to execute programs describing the processing of the respective functional modules. The computer may have a circuit configuration in which hardware components, for example, a microprocessor such as a CPU, memory devices (primary memory devices) such as a random access memory (RAM) and a read-only memory (ROM), a hard disk drive (HDD) controller that controls an HDD, various input/output (I/O) interfaces, and a network interface that controls connection to a network such as a local area network, are connected to one another via, for example, a bus. Devices, such as a disc drive for reading and/or writing to a transportable disc recording medium such as a compact disc (CD) or a digital versatile disc (DVD), and a memory reader/writer for reading from and/or writing to a transportable non-volatile recording medium of various standards, such as a flash memory, may further be connected to the bus via, for example, an I/O interface. A program describing the content of the processing of the respective functional modules described as illustrative examples is stored in a persistent storage device such as a hard disk drive via a recording medium such as a CD or a DVD over a communication medium such as a network, and is installed into the computer. The program stored in the persistent storage device is read onto the RAM, and is executed by the microprocessor such as the CPU to implement the functional modules described above as illustrative examples.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
 a plurality of auxiliary processing devices that perform predetermined processing on image data; and
 a distribution section that divides image data for one page into a plurality of processing units and that distributes the plurality of processing units respectively to the auxiliary processing devices,
 wherein the distribution section calculates the number of divisions indicating the number of pieces into which image data for one page is to be divided, in accordance with the number of auxiliary processing devices, the number of processing units that one auxiliary processing device is capable of simultaneously receiving and processing, and a degree of page parallelism indicating the number of pages of image data to be input in a period during which one auxiliary processing device processes image data for one page, and the distribution section divides the image data for one page into processing units, the number of which is equal to the calculated number of divisions, and distributes the processing units respectively to the auxiliary processing devices.

2. The image processing apparatus according to claim 1, further comprising a measurement section that measures a time interval between input pages in parallel to input of image data for each page,
 wherein the distribution section updates the degree of page parallelism using the time interval measured by the measurement section, and calculates the number of divisions using the updated degree of page parallelism.

3. The image processing apparatus according to claim 1, wherein the distribution section records a history of processing load levels of processing units previously distributed respectively to the auxiliary processing devices, and refers to the history when selecting processing units to be distributed respectively to the auxiliary processing devices, thereby selecting processing units to be distributed respectively to the auxiliary processing devices so that time averages of processing load levels of processing units to be distributed respectively to the auxiliary processing devices are made uniform across the auxiliary processing devices as long as page order is maintained.

4. The image processing apparatus according to claim 1, wherein the distribution section transfers, while an auxiliary processing device is executing processing on a first processing unit, a second processing unit to be distributed next to the auxiliary processing device, and when the auxiliary processing device completes the processing of the first processing unit, the distribution section causes processing of the second processing unit to be started, and
 wherein the number of processing units that the one auxiliary processing device simultaneously receives and processes is two.

5. The image processing apparatus according to claim 1, wherein the distribution section calculates the number of divisions by dividing a value obtained by multiplying the number of auxiliary processing devices by the number of processing units that one auxiliary processing device is capable of simultaneously receiving and processing, by a degree of page parallelism indicating the number of pages of image data to be input in a period during which one auxiliary processing device processes image data for one page.

6. The image processing apparatus according to claim 2, wherein the distribution section calculates the number of divisions by dividing a value obtained by multiplying the number of auxiliary processing devices by the number of processing units that one auxiliary processing device is capable of simultaneously receiving and processing, by a degree of page parallelism indicating the number of pages of image data to be input in a period during which one auxiliary processing device processes image data for one page.

7. A non-transitory computer readable medium storing a program causing a computer to execute a process, the process comprising:
 dividing image data for one page into a plurality of processing units, and distributing the plurality of processing units respectively to auxiliary processing devices,
 the dividing including
 calculating the number of divisions indicating the number of pieces into which image data for one page is to be divided, in accordance with the number of auxiliary processing devices, the number of processing units that one auxiliary processing device is capable of simultaneously receiving and processing, and a degree of page parallelism indicating the number of pages of image data to be input in a period during which one auxiliary processing device processes image data for one page,
 dividing the image data for one page into processing units, the number of which is equal to the calculated number of divisions, and
 distributing the processing units respectively to the auxiliary processing devices.

8. The image processing apparatus according to claim 1, wherein the number of divisions indicating the number of pieces into which image data for one page is to be divided is calculated based on the following equation:

$$N=(Y*2)/P, \text{ wherein}$$

N is the number of divisions indicating the number of pieces into which image data for one page is to be divided,
Y is the number of processing units that one auxiliary processing device is capable of simultaneously receiving and processing, and P is the degree of page parallelism indicating the number of pages of image data to be input in a period during which one auxiliary processing device processes image data for one page.

\* \* \* \* \*